(12) United States Patent
Veith

(10) Patent No.: US 7,702,241 B2
(45) Date of Patent: Apr. 20, 2010

(54) OPTICAL SIGNAL REGENERATOR AND TRANSMISSION SYSTEM

(75) Inventor: Gustav Veith, Bad Liebenzell (DE)

(73) Assignee: Alcatel, Paris (FR)

( * ) Notice: Subject to any disclaimer, the term of this patent is extended or adjusted under 35 U.S.C. 154(b) by 623 days.

(21) Appl. No.: 11/608,158

(22) Filed: Dec. 7, 2006

(65) Prior Publication Data

US 2007/0172242 A1    Jul. 26, 2007

(30) Foreign Application Priority Data

Jan. 20, 2006   (EP)   ................................. 06290172

(51) Int. Cl.
  *H04B 10/00*   (2006.01)
  *H04B 10/12*   (2006.01)
  *H04J 14/02*   (2006.01)
(52) U.S. Cl. .......................... 398/81; 398/147; 398/159
(58) Field of Classification Search ............. 398/25–29, 398/33, 81, 147, 148, 152, 158, 159, 177
See application file for complete search history.

(56) References Cited

U.S. PATENT DOCUMENTS

| 6,385,356 | B1 * | 5/2002 | Jopson et al. .................. 385/11 |
| 7,218,856 | B2 * | 5/2007 | Takahara et al. ............... 398/81 |
| 2001/0028760 | A1 * | 10/2001 | Yaffe ............................ 385/27 |
| 2002/0015207 | A1 | 2/2002 | Ooi et al. |
| 2002/0126351 | A1 * | 9/2002 | Chung et al. ................. 359/124 |
| 2005/0078964 | A1 | 4/2005 | Takahara et al. |

FOREIGN PATENT DOCUMENTS

| EP | 0 684 709 A1 | 11/1995 |
| EP | 0 874 477 A2 | 10/1998 |
| EP | 1 030 472 A2 | 8/2000 |
| WO | WO 2005/096528 | 10/2005 |

* cited by examiner

*Primary Examiner*—Dalzid Singh
(74) *Attorney, Agent, or Firm*—Carmen Patti Law Group, LLC

(57) ABSTRACT

A regenerator (7.*x*, 7.1-7.3) for regenerating optical signals on optical transmission links (4), in particular for use in a Dense Wavelength Division Multiplex (DWDM) optical transmission system. The regenerator (7.*x*, 7.1-7.3) comprises optical amplification means (7.*xa*, 7.*xd*) for compensating optical power losses, and a deterministic adaptation unit (7.*xb*) comprising means being adapted to compensate deterministic transmission impairments of the optical transmission link (4), in particular optical dispersion compensating means being adapted to compensate for chromatic dispersion of said link (4). The proposed regenerator (7.*x*, 7.1-7.3) further comprises a non-deterministic adaptation unit (7.*xc*) comprising means for compensating time variant non-deterministic transmission impairments, in particular polarisation mode dispersion. In this way, the proposed regenerator overcomes transmission limitations and improves robustness of long and ultra-long-haul multi-span DWDM transmission systems with respect to deterministic and non-deterministic transmission impairments.

12 Claims, 2 Drawing Sheets

OPTICAL SIGNAL REGENERATOR AND TRANSMISSION SYSTEM

The invention is based on a priority application EP 06 290 172.3 which is hereby incorporated by reference.

FIELD OF THE INVENTION

The present invention relates to a regenerator for regenerating optical signals on optical transmission links, in particular for use in a Dense Wavelength Division Multiplex (DWDM) optical transmission system, comprising: optical amplification means for compensating optical power losses and a deterministic adaptation unit comprising means being adapted to compensate deterministic transmission impairments of the optical transmission link, in particular optical dispersion compensation means adapted to compensate for chromatic dispersion of said link.

BACKGROUND OF THE INVENTION

The present invention also relates to an optical signal transmission system, comprising at least one transmitter, at least one receiver, and an optical transmission link connecting the transmitter with the receiver, as well as to a method for regenerating optical signals in at least one location along an optical transmission link, in particular in a Dense Wavelength Division Multiplex (DWDM) optical transmission system, comprising the steps of: amplifying the optical signal for compensating optical power losses, and compensating deterministic transmission impairments, in particular chromatic dispersion, of the optical transmission link.

Current (ultra-)long-haul multi-span DWDM optical transmission systems are usually equipped with inline 2R-regenerators (optical fibre amplifiers—OFA) for recovering the optical power level of the DWDM channels in order to improve the link power budget. In some cases, said 2R-regenerators are combined with inline dispersion compensation means in the form of dispersion compensation fibres (DCF) for the adaptation of deterministic residual chromatic dispersion of the link. In the present context, the term "deterministic" generally refers to effects which are foreseeable and predictable with respect to the used transmission wavelengths, the link fibre material, the span length, etc., as is the case with chromatic dispersion. Both functions mentioned above are usually combined in so-called dispersion compensation units (DCU) including an input optical amplifier for compensating the preceding link losses, i.e., power losses induced by preceding fibre spans, an interstage dispersion compensating fibre (DCF), and an output optical amplifier for compensating the DCF losses and for adapting the signal output power level.

However, conventional inline 2R-regenerators are not capable of managing/controlling time variant, e.g. statistically fluctuating, transmission impairments, such as polarisation mode dispersion (PMD) or temperature dependent chromatic dispersion variation on (ultra-)long-haul DWDM links. Such time variant transmission impairments will hereinafter also be referred to as "non-deterministic" dispersion or distortion effects, since they may be foreseeable while generally being unpredictable.

Optical receivers used in transmission systems of the above-mentioned type are usually equipped with forward error correction (FEC) means in order to improve the system margins and to overcome the tight optical signal-to-noise (OSNR) limitations of high bit rate (ultra-)long-haul transmission systems. However, due to the unpredictable, statistically fluctuating signal distortions mentioned above, which may among others be caused by polarisation mode dispersion (PMD), unacceptable error bursts may occur during one FEC frame, thus leading to a system outage in DWDM systems equipped only with conventional 2R-regenerators.

SUMMARY OF THE INVENTION

It is the object of the present invention to suppress transmission impairments and to improve the robustness of long-haul and ultra-long-haul multi-span optical transmission systems, in particular DWDM transmission systems.

According to a first aspect of the present invention the object is achieved by a regenerator of the above-mentioned type, which further comprises a non-deterministic adaptation unit comprising means for compensating time variant non-deterministic transmission impairments, in particular polarisation mode dispersion.

According to a second aspect of the present invention the object is also achieved by an optical transmission system of the above-mentioned type, wherein the optical signal transmission system comprises at least one regenerator according to the first aspect of the present invention arranged in the optical transmission link.

According to a third aspect of the invention, this object is also achieved by a method of the above-mentioned type, comprising the further step of compensating time variant non-deterministic transmission impairments, in particular polarisation mode dispersion of the optical transmission link.

Thus, in contrast to conventional 2R-regenerators and optical transmission systems incorporating such regenerators, the inventive regenerator, the inventive transmission system, and the inventive method, respectively, are capable of managing/controlling not only deterministic transmission impairments but also time variant, non-deterministic transmission impairments like statistically fluctuating polarisation mode dispersion (PMD) and/or temperature dependent chromatic dispersion variations on (ultra-)long-haul DWDM links, hereby avoiding system outage due to uncontrollable time variant error bursts while overcoming the above-mentioned limitations of the prior art.

In a further embodiment of the regenerator in accordance with the present invention, the optical amplification means comprise first and second optical amplifiers, such that at least one of the deterministic adaptation unit and the non-deterministic adaptation unit is arranged between the first and second optical amplifiers. This provides efficient compensation of losses induced by preceding fibre spans in a multi-span transmission system as well as efficient control of interstage losses in connection with output power adaptation.

Advantageously, in another embodiment of the regenerator in accordance with the present invention, the non-deterministic adaptation unit is arranged behind the deterministic adaptation unit. In this way, the non-deterministic adaptation unit can focus on controlling only residual transmission impairments not compensated by the deterministic adaptation unit, which leads to highly economic system operation.

In a preferred embodiment of the regenerator in accordance with the present invention, the non-deterministic adaptation unit comprises at least one of polarisation scrambling elements (PSC) and adaptive equalising elements for to achieve compensation of time variant transmission impairments. Said adaptive equalising elements can be devised as optical and/or electrical equalising elements.

Advantageously, in yet another embodiment of the regenerator in accordance with the present invention the deterministic adaptation unit comprises at least one of tunable chromatic dispersion and dispersion slope compensating elements, e.g. in the form of a dispersion compensation fibre. In this case, the deterministic adaptation unit can be tuned to comply with, for instance, variations of the bit rate on a DWDM channel or modifications of the modulation format, or modifications of the transmission path.

In preferred further embodiments of the regenerator in accordance with the present invention, the deterministic adaptation unit and/or the non-deterministic adaptation unit function with preset (fixed) or with variable (i.e., internally or externally controlled) operation parameters or with a combination of said two parameter types. Accordingly, at least one of the deterministic adaptation unit and the non-deterministic adaptation unit can be adapted to operate with preset (fixed) adaptation parameters. Alternatively or additionally, at least one of the deterministic adaptation unit and the non-deterministic adaptation unit can be adapted to operate with controllable adaptation parameters.

In particular when using controllable adaptation parameters, in a further embodiment of the regenerator in accordance with the present invention the latter further comprises a local control unit adapted to control adaptation parameters of at least one of the deterministic adaptation unit and the non-deterministic adaptation unit, said local control unit being further adapted to determine optical signal parameters from the optical transmission link and to control said adaptation parameters in accordance with said optical signal parameters. To this end, in yet a further embodiment the regenerator in accordance with the present invention preferably comprises a number of taps in operative connection with both the optical transmission link and the local control unit for to perform an inline signal analysis on individual DWDM channels and/or broadband multi-channel DWDM channel groups, wherein the results of said inline signal analysis are used locally to control the adaptation parameters of the deterministic adaptation unit and/or the non-deterministic adaptation unit.

Alternatively or additionally, in another embodiment of the regenerator in accordance with the present invention the latter further comprises a remote control unit adapted to control adaptation parameters of at least one of the deterministic adaptation unit and the non-deterministic adaptation unit, said remote control unit being further adapted to receive externally determined optical signal parameters and to control said adaptation parameters in accordance with the received optical signal parameters. Therefore, in contrast to the embodiment described further up, control of the adaptation parameters is based on receiver side signal analysis rather than inline signal analysis. In this context, the regenerator in accordance with the present invention, i.e. the remote control unit comprised therein, may either receive "raw" optical signal parameters as measured on the receiver side of the optical transmission system for inline determination of suitable control parameters, or the remote control unit may receive a remote control signal for parameter adaptation derived from the optical signal parameters on the receiver side of the optical transmission system. This setup of the regenerator in accordance with the present invention enables highly flexible transmission impairment control and managing mechanisms.

In order to further increase the functionality of the regenerator in accordance with the present invention, the latter may further comprise a transport network management control unit adapted to communicate transmission status information data to at least one additional unit connected with the optical transmission link, e.g. a central control unit, said transmission status information data comprising at least one of signal quality, quality of transmission, power level, and transmission impairment status for a present transmission link span and/or the preceding transmission link spans. Preferably, said information data is provided for individual DWDM channels, a selection of DWDM channel groups or for the full DWDM channel ensemble, either for the present transmission link span or for the preceding transmission link spans. In this way, the regenerator in accordance with the present invention is able to inform additional transmission link units, e.g. other regenerators, transmitter, receiver, etc., on the status of one or a plurality of DWDM channels. Alternatively or additionally, said information may also be provided to a central optical network management unit, as already mentioned above.

In a corresponding further embodiment of the optical signal transmission system in accordance with the present invention the optical signal transmission system is a DWDM system, wherein the transmitter and receiver includes suitable multiplexing and demultiplexing means and wherein the regenerator is adapted to control deterministic and non-deterministic transmission impairments on at least one of individual DWDM channels, a selection of DWDM channel groups, and the full DWDM channel ensemble.

Further advantages and characteristics of the present invention can be gathered from the following description of a preferred embodiment given by way of example only with reference to the enclosed drawings. The features mentioned above as well as below can be used in accordance with the present invention either individually or in conjunction. The embodiments mentioned are not to be understood as an exhaustive enumeration but rather as examples with regard to the underlying concept of the present invention.

DETAILED DESCRIPTION OF THE INVENTION

Figure 1:
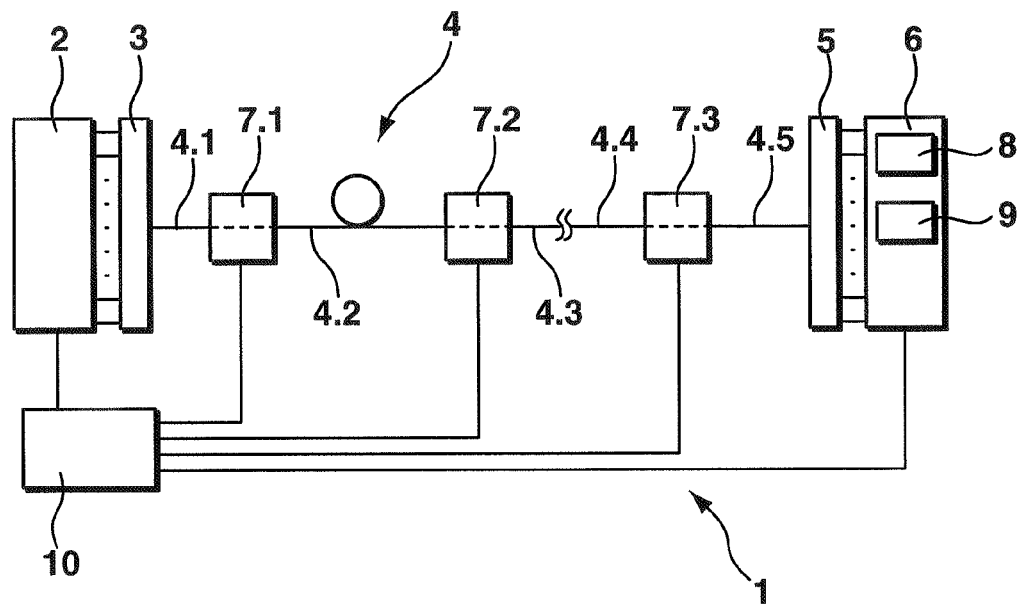
FIG. 1 is a schematic block diagram of a DWDM optical transmission system in accordance with the present invention.

FIG. 1 shows a Dense Wavelength Division Multiplex (DWDM) optical transmission system 1 in accordance with the present invention. The system 1 shown is devised as a long-haul multi-span DWDM transmission system and comprises a transmitter 2 in operative connection with a multiplexer 3. The multiplexer 3 is further connected with a first span of optical fibre 4.1. The first span of optical fibre 4.1 and a number of corresponding spans 4.2-4.5, generally denoted 4.$x$ ($x=1, \ldots, 5$), constitute an optical transmission link 4 connecting the transmitter 2/multiplexer 3 with a suitable demultiplexer 5/receiver 6 of the optical transmission system 1.

In order to recover the optical power level of the DWDM channels for to improve the link power budget and in order to compensate transmission impairments of the link 4, the latter further comprises—effectively interconnecting the optical fibre spans 4.1-4.5 (4.$x$)—a number of regenerators 7.1-7.3 in accordance with the present invention, which will be explained in detail with reference to appended FIG. 2. Furthermore, the optical transmission system 1 in accordance with the present invention comprises a forward error correction (FEC) unit 8 and a received signal analysis unit 9 comprised in the receiver 6. The optical transmission system 1 also has a central optical network management unit 10.

Figure 2:
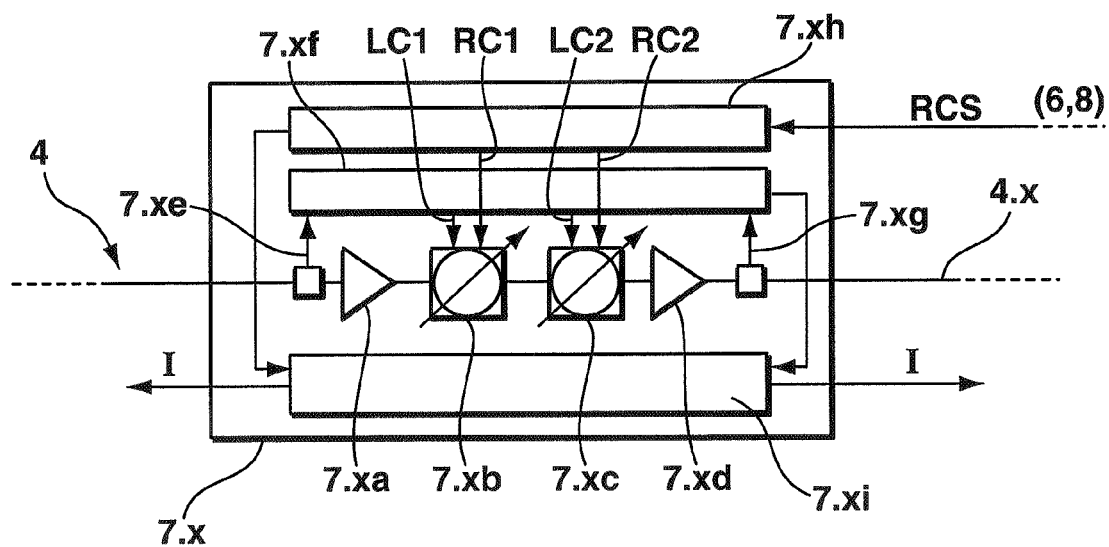
FIG. 2 is a schematic block diagram of a regenerator in accordance with the present invention and used in the optical transmission system of FIG. 1.

FIG. 2 shows a regenerator 7.x (x=1, 2, 3; cf. FIG. 1) in accordance with the present invention as used in the optical transmission system 1 of FIG. 1. The regenerator 7.x comprises an input optical amplifier 7.xa (OFAi), a deterministic adaptation unit (DAU) 7.xb, a non-deterministic adaptation unit (NDAU) 7.xc, and an output optical amplifier 7.xd (OFAo) arranged in series on the optical transmission link 4. On the optical transmission link 4 and in front of the input optical amplifier 7.xa there is provided a local input control (LIC) tap 7.xe in operative connection with an internal/local control unit (LCU) 7.xf. A further local output control (LOC) tap 7.xg is arranged behind the output optical amplifier 7.xd and is also connected with both the transmission link 4, i.e. a given span 4.x, and the local control unit 7.xf.

In addition, the regenerator 7.x in accordance with the present invention comprises an external/remote control unit (RCU) 7.xh, which is operatively connected with the signal analysis unit 8 of the receiver 6 (FIG. 1) for receiving a remote control signal RCS therefrom. Furthermore, in accordance with the present embodiment the regenerator 7.x comprises a transport network management (TNM) control unit 7.xi adapted for communication with further functional units of the optical transmission system 1 in accordance with the present invention, e.g., the transmitter 2, the receiver 6, other regenerators 7.1-7.3, and/or the central network management unit 10, as indicated by means of horizontal arrows denoted I in FIG. 2. In addition, the transport network management (TNM) control unit 7.xi is connected with the local control unit 7.xf and with the remote control unit 7.xh for communication of local and/or remote adaptation parameters to be transmitted as explained above with reference to arrows I.

In the embodiment shown, the deterministic adaptation unit (DAU) 7.xb functions as a means for compensating/controlling of deterministic transmission impairments, e.g. the residual chromatic dispersion and dispersion slope of the transmission link. The DAU can, for instance, be realised on the basis of tunable chromatic dispersion and dispersion slope compensating elements, such as a dispersion compensating fibre (DCF), as known to a person skilled in the art. The non-deterministic adaptation unit (NDAU) 7.xc functions as a means for compensating/controlling of non-deterministic (i.e., statistically variable or otherwise unpredictable) transmission impairments, e.g. temperature-dependent effects. The NDAU can, e.g., be realised by means of adaptive (electronical and/or optical) equalising elements and/or by polarisation scrambling elements (PSC), as known to a person skilled in the art. The input and output optical amplifiers 7.xa and 7.xb, respectively, are arranged in the transmission link for compensating the losses of the preceding transmission link (link spans) and of the preceding interstage elements, i.e., the DAU and NDAU and/or for adapting the output power of the regenerator 7.x, respectively. The local input control (LIC) signal tap 7.xe and the local output control (LOC) signal tap 7.xg provide tapping of individual DWDM channels, of a selection of DWDM channel groups, and of the full DWDM channel ensemble, respectively. In this way, the local control unit (LCU) 7.xf can gather information concerning optical signal parameters on the optical transmission link in a flexible way and control both the DAU 7.xb and the NDAU 7.xc accordingly in order to manage/control transmission impairments. In FIG. 2, controlling the adaptation parameters of the DAU 7.xb and/or the NDAU 7.xc by means of the local control unit (LCU) 7.xf is illustrated by arrows LC1, LC2.

Alternatively, or additionally, the remote control unit (RCU) 7.xh can be used to control the adaptation parameters of the DAU 7.xb and/or the NDAU 7.xc in accordance with the remote control signal RCS derived according to measurement results obtained by the received signal analysis unit 9 (FIG. 1) and transmitted to the remote control unit 7.xh by the receiver 6 (FIG. 1) and comprising control parameters derived from receiver side signal analysis, e.g., including forward error correction (FEC) performed by the FEC unit 8 (FIG. 1). In FIG. 2, controlling the adaptation parameters of the DAU 7.xb and/or the NDAU 7.xc by means of the remote control unit (RCU) 7.xh is illustrated by arrows RC1, RC2.

The optical transmission link signal parameters determined inline by the local control unit (LCU) 7.xf can be communicated throughout the optical transmission system 1 in accordance with the present invention by means of the transport network management (TNM) control unit 7.xi. The latter therefore functions as a means for providing information on the status (e.g. signal quality, quality of transmission, power level, transmission impairments, status) of individual DWDM channels, a selection of DWDM channel groups or for the full DWDM channel ensemble and for the transmission characteristics of the preceding optical transmission links (link spans located "up-stream" from the present regenerator with respect to a signal transmission direction), respectively.

In this way, the above-described regenerator 7.x effectively presents an inline multifunctional regenerator (MFR) for use in (ultra-)long-haul DWDM optical transmission systems including individual DWDM channel and/or broadband multi-channel DWDM control mechanisms, as described above.

In order to control the overall transmission performance of an optical transmission system as shown in FIG. 1 or a network comprising a plurality of such transmission systems, it is not necessary to replace all conventional 2R regenerators by multifunctional regenerators. Namely, to control transmission performance, it is sufficient to replace only part of the conventional 2R regenerators, in particular those which are located at the nodes of the network. Thus, the present invention addresses a key building block for flexible future optical transport networks which allow for dynamical adaptation of the link configuration.

Referring again to FIGS. 1 and 2, the beneficial application of the inline multifunctional regenerator (MFR) for mitigation of deterministic and non-deterministic DWDM channel transmission impairments in multi-span high bit rate DWDM systems will now be described in more detail by way of an example:

The DWDM channels are optically combined in the DWDM transmitter multiplexer 3 and optically separated in the receiver demultiplexer 5 after a long-haul transmission over the multi-span transmission link 4. State of the art optical receivers are generally equipped with forward error correction (FEC) means 8 in order to improve the system margins and to overcome the tight optical signal-to-noise (OSNR) limitations of high bit rate long-haul transmission systems. FEC as such is assumed to be known to a person skilled in the art.

Figure 3:
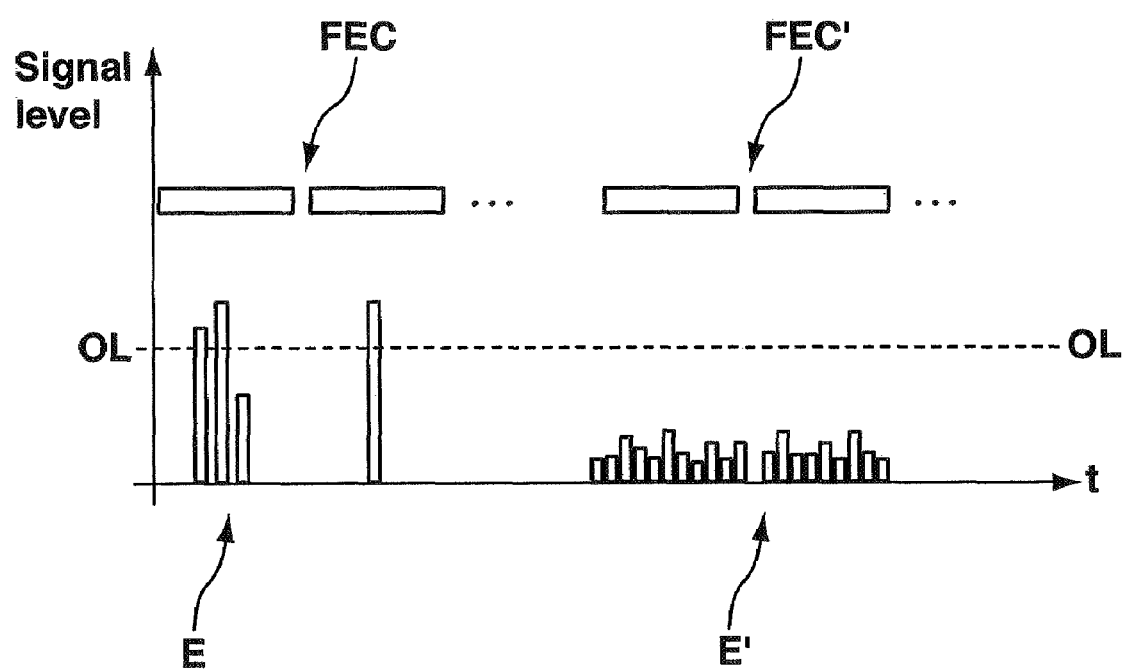
FIG. 3 is a diagram illustrating the control of transmission impairments in accordance with the present invention and in comparison with the performance of prior art systems.

However, due to unpredictable, statistically fluctuating signal distortions caused, for instance, by polarisation mode dispersion (PMD), unacceptable error bursts may occur during the duration of one FEC frame, which may lead to a system outage, if the intensity of such error bursts exceeds a predefined outage level. This is illustrated by means of FIG. 3 (left hand side) wherein the horizontal bars FEC depict individual FEC frames and wherein the vertical bars E represent individual error bursts, which partly exceed an outage level OL (dashed horizontal line) of the system. Time is denoted t in FIG. 3.

In contrast to this, using the inventive multifunctional regenerator (MFR) 7.x deterministic transmission impairments (e.g., due to residual chromatic dispersion) are suppressed by the deterministic adaptation unit 7.xb (DAU), e.g. by a tunable dispersion and dispersion slope compensation element (DCF) using variable, i.e. internally or externally controlled, operation parameters, as already described above. Alternatively, the DAU 7.xb may also operate with preset (fixed) adaptation parameters, which may be stored in suitable storage means (not shown) comprised in the regenerator 7.x of FIG. 2. In addition, non-deterministic transmission impairments (e.g., due to polarisation mode dispersion and/or temperature-dependent effects) are suppressed by the non-deterministic adaptation unit 7.xc (NDAU), preferably devised as fast polarisation scrambling elements (PSC) with either preset (fixed) or variable (i.e., internally or externally controlled) operation parameters in combination with forward error correcting (FEC) receivers 6, 8.

Potential system outage due to non-deterministic transmission impairments, as already mentioned above with reference to FIG. 3, can be suppressed efficiently and simultaneously for all DWDM channels by using the inventive multifunctional regenerator (MFR). In the particular embodiment described here, the MFR includes a multisection polarisation scrambler (PSC) as non-deterministic adaptation unit (NDAU), which provides high scrambling frequencies for all DWDM channels. This particular feature allows to suppress individual critical error bursts and distribute a number of error bursts with moderate intensity level equally over a given FEC frame, hereby avoiding system outage on all DWDM channels. This is illustrated on the right hand side of FIG. 3, wherein again the horizontal bars FEC' symbolise individual FEC frames whereas the vertical bars E' symbolise error bursts of moderate intensity which are found to lie below the predefined outage level OL (dashed horizontal line).

In addition or alternatively, the NDAU may also include adaptive electronical and/or optical equalising elements for suppressing non-deterministic signal distortions.

As already mentioned above, in the simplest case, the DAU/NDAU can operate without any local control unit (LCU) or remote control unit (RCU) using preset operating conditions. For instance, in the above-mentioned case of a NDAU with polarisation scramblers (PSC) the individual section scrambling frequencies can be kept constant during system operation. However, if the channel bit rate and/or the modulation format and/or link configuration are changed or if non-deterministic changes are present in the physical transmission path (transmission link 4 of FIG. 1), e.g., in the form of polarisation mode dispersion, temperature induced variations of chromatic dispersion, or the like, it may be necessary to modify the DAU/NDAU operating parameters via the local control unit (LCU) and/or the remote control unit (RCU), respectively. As already described in detail above, the local control unit (LCU) will enable to control/manage transmission impairments via the MFR on the basis of control parameters derived directly from an inline signal analysis. In contrast to this, the remote control unit (RCU) will enable to control/manage transmission impairments via the MFR on the basis of control parameters derived from receiver side signal analysis, which preferably includes FEC.

In this way, the present invention enables to overcome transmission limitations and to improve the robustness of (ultra-)long-haul multi-span DWDM transmission systems with respect to both deterministic and non-deterministic transmission impairments.

The invention claimed is:

1. A regenerator for regenerating optical signals on optical transmission links, in particular for use in a Dense Wavelength Division Multiplex (DWDM) optical transmission system, comprising:
    optical amplification means for compensating optical power losses,
    a deterministic adaptation unit comprising means being adapted to compensate deterministic transmission impairments of the optical transmission link, in particular optical dispersion compensation means adapted to compensate for chromatic dispersion of said link, and
    a non-deterministic adaptation unit, arranged behind the deterministic adaptation unit, comprising means for compensating time variant non-deterministic transmission impairments, in particular polarization mode dispersion, characterized in that said non-deterministic adaptation unit comprises a multi-section scrambler for performing polarization scrambling of all DWDM channels of the optical transmission link,
    wherein the DWDM optical transmission system employs Forward Error Correction (FEC).

2. The regenerator of claim 1, wherein the optical amplification means comprise first and second optical amplifiers and in that at least one of the deterministic adaptation unit and the non-deterministic adaptation unit is arranged between the first and second optical amplifiers.

3. The regenerator of claim 1, wherein the non-deterministic adaptation unit comprises at least one adaptive equalising element.

4. The regenerator of claim 1, wherein the deterministic adaptation unit comprises at least one of tunable chromatic dispersion and dispersion slope compensating elements.

5. The regenerator of claim 1, wherein at least one of the deterministic adaptation unit and the non-deterministic adaptation unit is adapted to operate with preset adaptation parameters.

6. The regenerator of claim 1, wherein at least one of the deterministic adaptation unit and the non-deterministic adaptation unit is adapted to operate with controllable adaptation parameters.

7. The regenerator of claim 1, further comprising a local control unit adapted to control adaptation parameters of at least one of the deterministic adaptation unit and the non-deterministic adaptation unit, said local control unit being further adapted to determine optical signal parameters from the optical transmission link and to control said adaptation parameters in accordance with said optical signal parameters.

8. The regenerator of claim 1, further comprising a remote control unit adapted to control adaptation parameters of at least one of the deterministic adaptation unit and the non-deterministic adaptation unit, said remote control unit being further adapted to receive externally determined optical signal parameters and to control said adaptation parameters in accordance with said optical signal parameters.

9. The regenerator of claim 1 further comprising a transport network management control unit adapted to communicate transmission status information data to at least one additional unit connected with the optical transmission link, said transmission status information comprising at least one of: signal quality, quality of transmission, power level, transmission impairment status, for a present transmission link span and/or the preceding transmission link spans.

10. An optical signal transmission system, comprising: at least one transmitter, at least one receiver, an optical transmission link, connecting the transmitter with the receiver, wherein the optical signal transmission system comprising at least one regenerator according to anyone of claims 1 to 9 arranged in the optical transmission link.

11. The optical signal transmission system of claim 10, wherein the optical signal transmission system is a Dense Wavelength Division Multiplex system, wherein the transmitter and the receiver include suitable multiplexing and demultiplexing means and wherein the regenerator is adapted to control deterministic and non-deterministic transmission impairment on at least one of: individual DWDM channels, a selection of DWDM channel groups, the full DWDM channel ensemble.

12. Method for regenerating optical signals in at least one location along an optical transmission link, in particular in a Dense Wavelength Division Multiplex optical transmission system, comprising the steps of: amplifying the optical signal for compensating optical power losses, compensating deterministic transmission impairments, in particular chromatic dispersion, of the optical transmission link, and compensating time variant non-deterministic transmission impairments, in particular polarization mode dispersion of the optical transmission link, characterized in that the step of compensating the time variant non-deterministic transmission impairments includes performing polarization scrambling of all DWDM channels of the optical transmission link in a multi-section polarization scrambler.

\* \* \* \* \*